(12) United States Patent
Kanungo et al.

(10) Patent No.: US 9,166,973 B2
(45) Date of Patent: Oct. 20, 2015

(54) SYSTEM AND METHOD FOR CONTROLLING ACCESS TO AN ELECTRONIC DEVICE

(71) Applicant: SLING MEDIA INC., Foster City, CA (US)

(72) Inventors: Rajesh Kanungo, Sunnyvale, CA (US); Benjamin Loomis, Campbell, CA (US)

(73) Assignee: Sling Media, Inc., Foster City, CA (US)

( * ) Notice: Subject to any disclaimer, the term of this patent is extended or adjusted under 35 U.S.C. 154(b) by 4 days.

(21) Appl. No.: 13/836,616

(22) Filed: Mar. 15, 2013

(65) Prior Publication Data

US 2014/0108811 A1    Apr. 17, 2014

Related U.S. Application Data

(60) Provisional application No. 61/712,637, filed on Oct. 11, 2012.

(51) Int. Cl.
| | |
|---|---|
| G06F 21/00 | (2013.01) |
| H04L 29/06 | (2006.01) |
| G06F 21/30 | (2013.01) |
| G06F 21/31 | (2013.01) |

(52) U.S. Cl.
CPC ............ H04L 63/083 (2013.01); G06F 21/305 (2013.01); G06F 21/31 (2013.01); H04L 63/0442 (2013.01); G06F 2221/2115 (2013.01)

(58) Field of Classification Search
CPC .............. H04L 63/0442; H04L 63/083; H04L 29/06782; G06F 21/31
USPC .......................................... 713/171, 182–183
See application file for complete search history.

(56) References Cited

U.S. PATENT DOCUMENTS

| | | | | |
|---|---|---|---|---|
| 8,281,380 | B2 * | 10/2012 | Ogawa | 726/8 |
| 2004/0019806 | A1 * | 1/2004 | Beyh | 713/201 |
| 2005/0044379 | A1 * | 2/2005 | Beard et al. | 713/182 |
| 2008/0065880 | A1 * | 3/2008 | Martin | 713/156 |
| 2008/0281953 | A1 * | 11/2008 | Blaisdell | 709/223 |
| 2009/0132723 | A1 * | 5/2009 | Schneider | 709/237 |
| 2011/0128966 | A1 * | 6/2011 | Westin et al. | 370/401 |
| 2012/0144466 | A1 * | 6/2012 | Ohkado | 726/6 |
| 2013/0138952 | A1 * | 5/2013 | Berggren | 713/156 |

OTHER PUBLICATIONS

Cisco, Configuring Secure Shell on Router and Switches Running Cisco IOS, Jun. 28, 2007, pp. 1-9.*
Ylonen et al, The Secure Shell Authentication Protocol, Jan. 2006, Cisco, pp. 1-17.*
Yoshida et al, Secure Graphical User Interface for Geant 4, 2004, IEEE, pp. 1614-1616.*

* cited by examiner

*Primary Examiner* — Christopher Brown
*Assistant Examiner* — Jenise Jackson
(74) *Attorney, Agent, or Firm* — Ingrassia Fisher & Lorenz, P.C.

(57) ABSTRACT

Methods and systems are provided for controlling access to an electronic device. The electronic device, for example, may include, but is not limited to, a processor, a memory communicatively coupled to the processor, wherein the memory is configured to store a password for accessing the electronic device, and a communication interface communicatively coupled to the processor, wherein the processor is configured to receive a request to access the electronic device from the communication interface, and transmit an encrypted version of the password for accessing the electronic device via the communication interface.

11 Claims, 3 Drawing Sheets

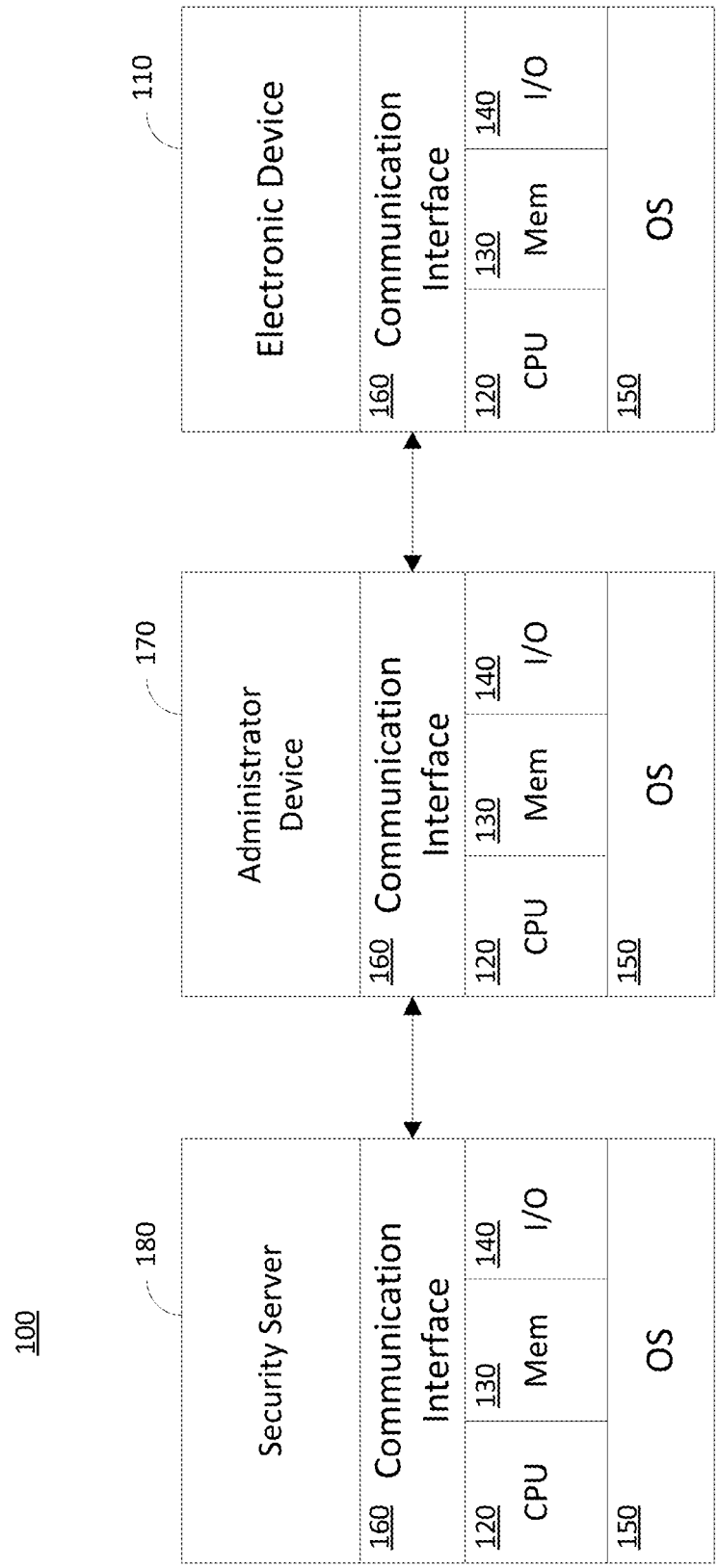

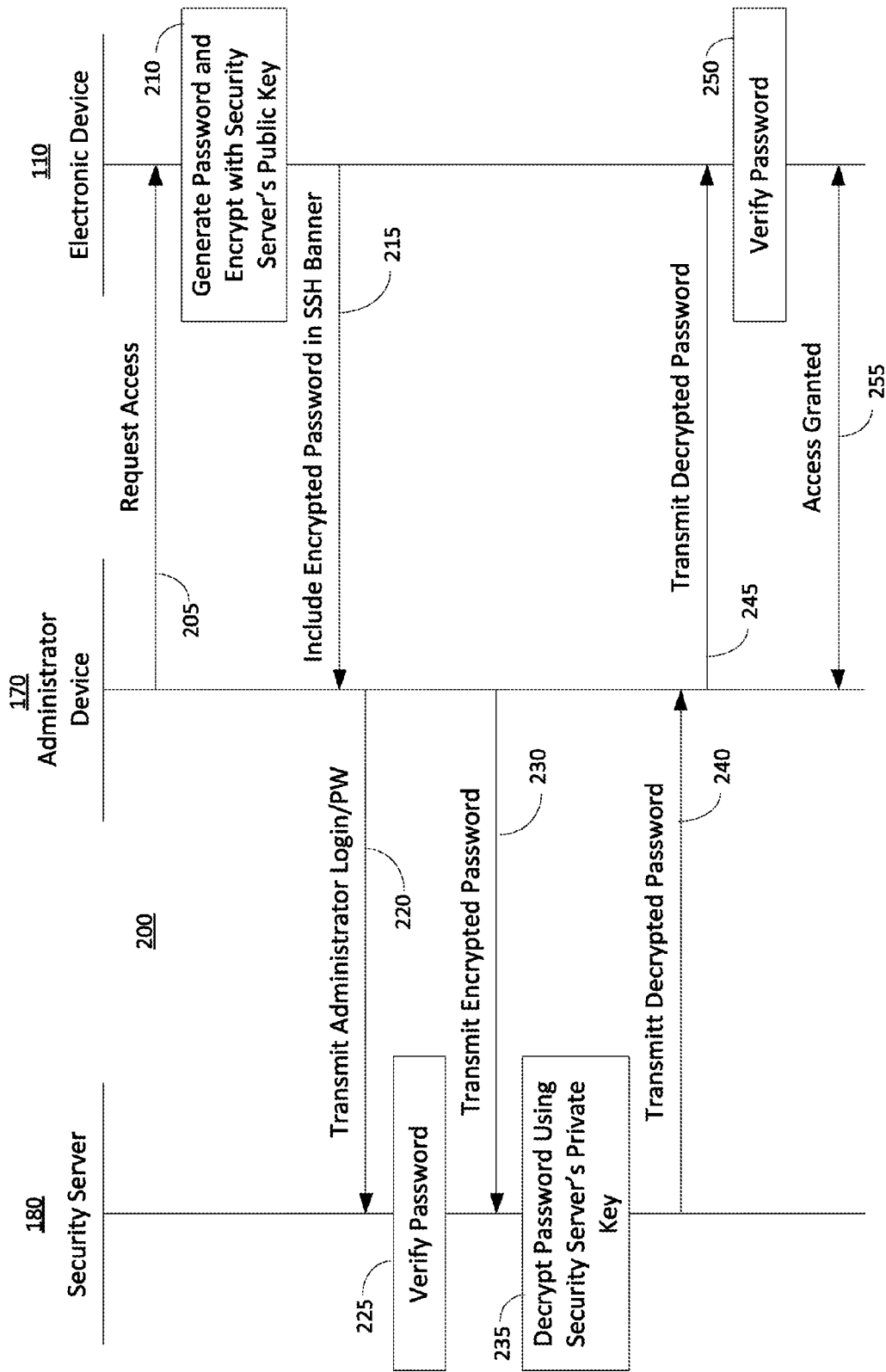

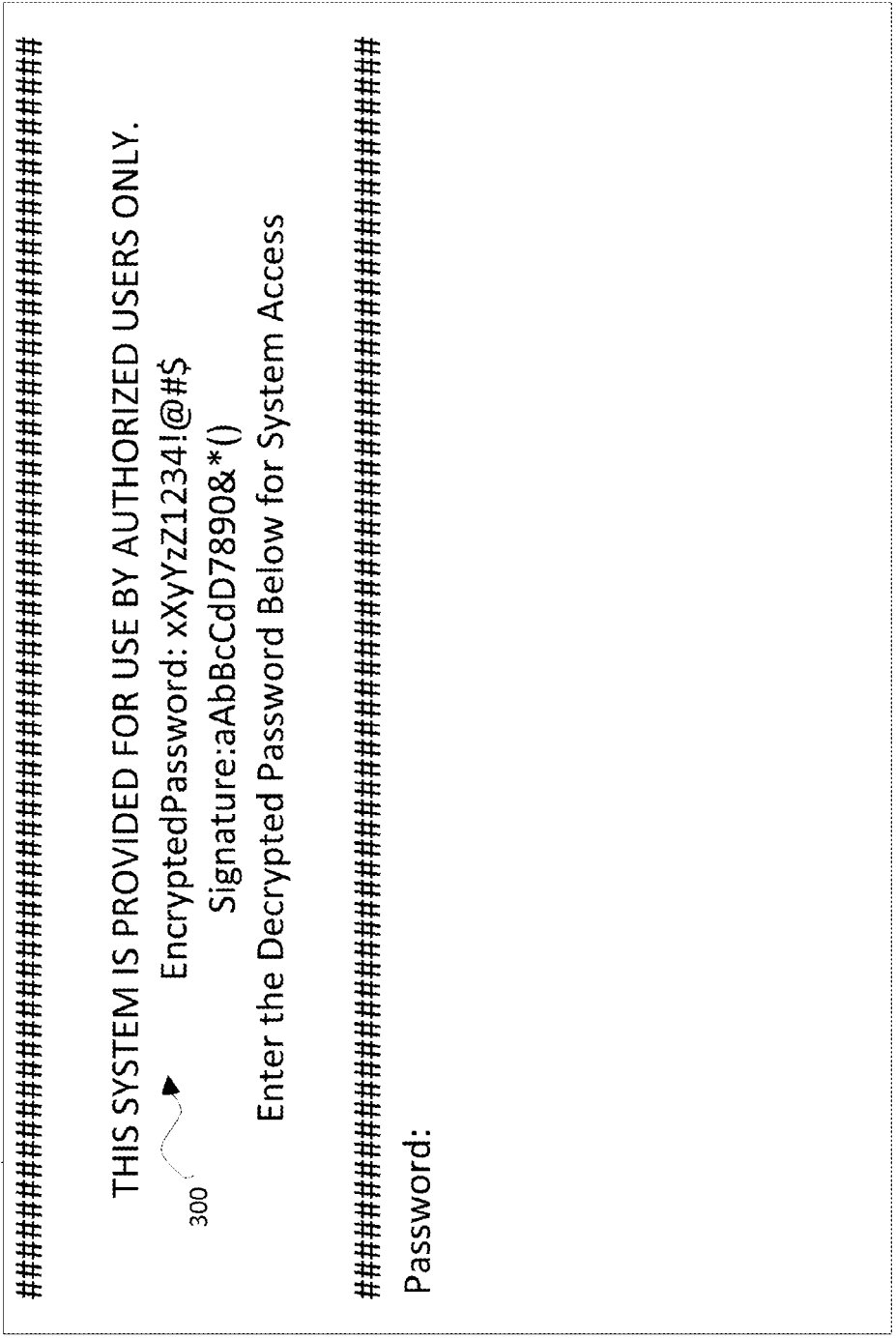

SYSTEM AND METHOD FOR CONTROLLING ACCESS TO AN ELECTRONIC DEVICE

TECHNICAL FIELD

The following relates to systems and methods for controlling access to an electronic device.

BACKGROUND

Electronic devices have to be serviced occasionally. In many instances the electronic device can be serviced remotely if the electronic device includes a communication interface, such as an internet or cellular connection. However, when an electronic device is capable of being serviced remotely, a security system needs to be in place to ensure that only authorized administrators are capable of accessing the electronic device.

SUMMARY

In accordance with one embodiment, a method for logging into an electronic device from an administrative device is provided. The method may include, but is not limited to requesting access to the electronic device, receiving, from the electronic device, a password for accessing the electronic device, where the received password is encrypted, transmitting the encrypted password to a security server, receiving, from the security server, a decrypted password, and transmitting the decrypted password to the electronic device.

In accordance with another embodiment, an electronic device is provided. The electronic device may include, but is not limited to a processor, a memory communicatively coupled to the processor, wherein the memory is configured to store a password for accessing the electronic device, and a communication interface communicatively coupled to the processor, wherein the processor is configured to receive a request to access the electronic device from the communication interface, and transmit an encrypted version of the password for accessing the electronic device via the communication interface.

In accordance with yet another embodiment, a method for controlling access to an electronic device having a processor, a communication interface, and a memory configured to store a first password for granting access to the electronic device is proved. The method may include, but is not limited to receiving, from the communication interface, a request to access the electronic device from an administrative device, transmitting, by the communication interface, an encrypted version of the first password to the administrative device, receiving, from the communication interface, a second password, comparing, by the processor, the first password and the second password, and granting, by the processor, access to the electronic device if the second password matches the first password.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWING FIGURES

Exemplary embodiments will hereinafter be described in conjunction with the following drawing figures, wherein like numerals denote like elements.

FIG. 1 is a block diagram of a system for securely remotely logging into an electronic device, in accordance with an embodiment;

FIG. 2 is a flow diagram illustrating a method for a accessing the electronic device, in accordance with an embodiment; and FIG. 3 illustrates an exemplary banner which could be displayed on the SSH client on an administrator device, in accordance with an embodiment.

DETAILED DESCRIPTION

According to various exemplary embodiments, systems and methods for securely remotely logging into a device are provided. As discussed above, when a device needs to be capable of being remotely accessed by an administrator for service, the device needs to have security in place to prevent unauthorized users from accessing the device. In accordance with one embodiment, for example, an electronic device is configured to implement a secure shell server. When an administrator attempts to access the device via a secure shell client, the electronic device transmits a password for accessing the electronic device in a banner. The password transmitted to the administrator is encrypted with a public key. The administrator has access to a private key via a security server which is capable of decrypting the password. Accordingly, a secure system for remotely accessing the device is implemented. Furthermore, since the device itself transmits the password for accessing the device, in an encrypted form, each device can be distributed with a different password or can have a variable password, improving the security of the device, without the administrative system having to keep track of each device's password.

FIG. 1 is a block diagram of a system 100 for securely remotely logging into an electronic device 110, in accordance with an embodiment. In one embodiment, for example, the electronic device 110 may be a place-shifting device, such as a Slingbox. A place-shifting device is a device capable of transmitting a packetized stream of media content over network. A places-shifting device incorporates suitable transcoder logic to convert audio/video or other media data into a packetized format that can be transmitted over the network. The media data may be in any format, and may be received from any source such as a broadcast, cable or satellite television programming source, a "video-on-demand" or similar source, a digital video disk (DVD) or other removable media, a video camera, and/or the like. In other embodiments, the electronic device 110 may be a personal computer, a laptop computer, a tablet, a cellular phone, a television, a set-top-box (STB), a digital-video recorder (DVR), or any other consumer or commercial electronic device.

The electronic device 110 includes a processor 120. The processor 120 may be a central processing unit (CPU), an application specific integrated circuit (ASIC), filed programmable logic array (FPLA), programmable logic controller (PLC), a microcontroller or any other type of logic device. The electronic device further includes a memory 130. The memory 130 may be any combination of non-volatile and volatile memories, including, but not limited to, one or more hard drives, any type of random access memory (RAM), any type of read only memory (ROM) and/or one or more computer readable memory devise (e.g., CD's, DVD's, etc.). The electronic device 110 further includes an user interface 140 allowing a user to interact with the electronic device 110. The user interface 140 will vary depending upon the type of device. In various embodiments, for example, the user interface 140 may be a display, a keyboard, a mouse, a touch screen, a remote control, electronic switches, or any other type of input device or combination thereof. The processor 120 of the electronic device 110 is configured to run an operating system 150. The operating system will vary depending upon the type electronic device. The electronic device 110 also includes a communication interface 160. The communication interface may be an internet network interface, a cellular interface or an interface for any other type of communication network, or a combination thereof. The communication interface 160 allows an administrator to access the electronic device 110 via a secure shell (SSH) for service, as discussed in further detail below.

The system 100 further includes an administrator device 170. The administrator device 170 may be, for example, a personal computer, a laptop computer, a tablet, a cellular phone or any other type of electronic device. The administrator device 170 includes a processor 120. The processor 120 may be a central processing unit (CPU), an application specific integrated circuit (ASIC), filed programmable logic array (FPLA), programmable logic controller (PLC), a microcontroller or any other type of logic device. The administrator device 170 further includes a memory 130. The memory 130 may be any combination of non-volatile and volatile memories, including, but not limited to, one or more hard drives, any type of random access memory (RAM), any type of read only memory (ROM) and/or one or more computer readable memory devise (e.g., CD's, DVD's, etc.). The administrator device 170 further includes an user interface 140 allowing an administrator to interact with the administrator device 170. The user interface 140 will vary depending upon the type of device. In various embodiments, for example, the user interface 140 may be a display, a keyboard, a mouse, a touch screen, or any combination thereof. The processor 120 of the administrator device 170 is configured to run an operating system 150. The operating system 150 will vary depending upon the type administrator device 170. The administrator device 170 also includes a communication interface 160. The communication interface may be an internet network interface, a cellular interface or an interface for any other type of communication network, or a combination thereof. The communication interface 160 allows an administrator to access the electronic device 110 via a secure shell (SSH) for service, as discussed in further detail below.

The system 100 further includes a security server 180. The security server 180 includes a processor 120. The processor 120 may be a central processing unit (CPU), an application specific integrated circuit (ASIC), filed programmable logic array (FPLA), programmable logic controller (PLC), a microcontroller or any other type of logic device. The security server 180 further includes a memory 130. The memory 130 may be any combination of non-volatile and volatile memories, including, but not limited to, one or more hard drives, any type of random access memory (RAM), any type of read only memory (ROM) and/or one or more computer readable memory devise (e.g., CD's, DVD's, etc.). The security server 180 further includes an user interface 140 allowing a user to interact with the security server 180. The user interface 140 will vary depending upon the type of device. In various embodiments, for example, the user interface 140 may be a display, a keyboard, a mouse, a touch screen, or any combination thereof. The processor 120 of the security server 180 is configured to run an operating system 150. The operating system 150 will vary depending upon the type security server 180. The security server 180 also includes a communication interface 160. The communication interface may be an internet network interface, a cellular interface or an interface for any other type of communication network, or a combination thereof. The communication interface 160 allows an administrator decode a password for the electronic device, as discussed in further detail below.

FIG. 2 is a flow diagram illustrating a method 200 for a accessing the electronic device 110, in accordance with an embodiment. When an administrator needs to remotely service an electronic device 110, the administrator, via the administrator device 170, utilizes a SSH client to request access to the electronic device 110. (Step 205). In one embodiment, for example, the processor 120 of the administrative devices 170 opens the SSH client and requests that the administrator enter in an address, such as an internet protocol (IP) address, of the electronic device 110. The operating system 150 of the electronic device 110 runs a SSH server. In one embodiment, for example, the SSH server may have a unique public/private key pairing, different from the processors public/private key pairing. Accordingly, in one embodiment for example, the SSH server may first display a hash of the public key. In this embodiment, for example, the administrator could note the hash of the public key for the SSH server for later comparison, as discussed in further detail below. In response to receiving the request to access the electronic device 110, a processor 120 of the electronic device 110 may generate a password which can be used to access the electronic device 110. (Step 210). The processor then encrypts the generated password with a public key. The encrypted password can only be decrypted by a private key. The private key is stored in a memory 130 on the security server, as discussed in further detail below. In one embodiment, for example, the password may change at predetermined intervals, such as hours, days, weeks, months, etc. In other embodiments, for example, the password may be changed for each session of the SSH server. In another embodiment, for example, the password may be static. In this embodiment the password may be stored in a memory 150 of the electronic device. The stored password may already be encrypted using the public key, or, the processor 120 of the electronic device may encrypt the password upon receiving the request from the administrative device. In one embodiment, for example, a unique identifier for the electronic device 110 may also be encrypted along with the password. The unique identifier may be used to verify a signature, as discussed in further detail below.

The encrypted password is then transmitted to the administrative device 170 in a banner to be displayed on the SSH client. (Step 215). FIG. 3 illustrates an exemplary banner 300 which could be displayed on a display 310 via the SSH client on an administrator device 170, in accordance with an embodiment. As seen in FIG. 3, the encrypted password is displayed in the banner 300. Once the administrator has decrypted the password, the administrator can enter the decrypted password into the SSH client to get access to the electronic device. As seen in FIG. 3, the banner may also display a signature. The signature may be encrypted with a private key stored in the processor 120 of the electronic device. The signature can be used to verify that the electronic device 110 is the device displaying the banner, as discussed in further detail below.

Returning to FIG. 2, the administrator then transmits administrator authentication information, such as a username and password, to the security server 180 over a secure connection, such as hypertext transfer protocol secure (HTTPS) or via a SSH session. (Step 220). The security server then verifies the administrator's credentials. (Step 225). In one embodiment, for example, after the administrator is logged into the security server, the administrator transmits the encrypted password to the security server 180. (Step 230). In another embodiment, for example, the administrator may transmit the encrypted password to the security server 180 at the same time as the authentication information. As discussed above, in some embodiments, the encrypted password may also include a unique identifier for the electronic device 110.

As discussed above, a memory 150 of the security server 180 stores a private key corresponding to the public key stored in the electronic device 110. Accordingly, a processor 120 of the security server 180 can decrypt the encrypted password using the private key. (Step 235). In one embodiment, for example, the private key may be encrypted on the server. Accordingly, if the server itself was stolen or the data compromised, the private keys stored on the server would be kept secure. In one embodiment, for example, the administrator's password may be used to decrypt a user-specific key which may be used to decrypt the private key. Because the private key is never transmitted over any of the communication interfaces 160 and the private key is encrypted on the server, the private key remains secure.

As discussed above, the banner may also include an encrypted signature which is encrypted by a private key stored in the processor 120 of the electronic device 110. The identifier decrypted with the encrypted password (i.e., the encrypted password displayed in the banner) may be used to look up a public key corresponding to the private key of the processor 120 of the electronic device. The processor 120 of the security server 180 can then decrypt the signature which may include a hash value of the encrypted password (i.e., the encrypted password displayed in the banner) as well as a hash value of the public key of the SSH server. As discussed above, the administrator or the security server could then compare the hash value of the public key of the SSH server to the previously displayed hash value to verify that the administrative device is really communicating with the electronic device, and not a rogue SSH server configured to display the same banner but then capture the decrypted password when the administrator uses it to log in.

The security server 180 then transmits the decrypted password to the administrator device 170. (Step 240). The administrator is then able to enter the decrypted password into the SSH client and transmit the decrypted password to the electronic device. (Step 245). A processor 120 of the electronic device then compares the decrypted password against the password stored in memory to verify that the password matches. (Step 250). If the password matches, the administrative device 170 is given access to the electronic device 110. (Step 255).

One benefit of the method and system, for example, is that each electronic device 110 can be given a different password, improving the security of each electronic device, and the administer of each of the electronic devices does not have to keep track of the passwords since they are given, in encrypted form, to the administrator when the administrator requests access to the respective electronic device 110. Furthermore, since the private key capable of decrypting the passwords is never transmitted over any of the communication interfaces 160, the system is more secure.

While the detailed description will discussed accessing an electronic device via a secure shell client, any device utilizing any operating system could be protected via the system discussed herein. For example, the encrypted password could be displayed on a Windows operating system login prompt, a Unix login prompt, an Android login prompt, an IOS login prompt, and Apple OS login prompt or any other login prompt on any type of device running any type of operating system.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method for logging into an electronic device from an administrative device, comprising:
   opening, by a processor of the administrative device, a secure shell client; and
   receiving, by the processor from a user interface of the administrative device, an address of the electronic device;
   requesting, by a communication interface of the administrative device at the received address of the electronic device, access to the electronic device through the secure shell client;
   receiving, by the processor via the communication interface, a banner in the secure shell client in response to the request for access to the electronic device from the administrative device, the banner comprising an encrypted password for accessing the electronic device embedded in the banner;
   transmitting, by the processor, the encrypted password to a security server via the communication interface of the administrative device;
   receiving, by the processor, a decrypted password from the security server via the communication interface of the administrative device; and
   transmitting, by the processor, the decrypted password to the electronic device via the secure shell client,
   wherein the password is encrypted using a public key and a private key corresponding to the public key is stored in a memory of the security server.

2. The method of claim 1, further comprising transmitting, to the security server, administrator authentication information.

3. The method claim 1, wherein the banner further includes an encrypted signature embedded in the banner, the method further comprising:
   transmitting, by the processor, the signature to the security server via the communication interface of the administrative device; and
   receiving, by the processor from the server via the communication interface of the administrative device, verification of an authenticity of the electronic device, the verification comprising:
      determining, by a processor of the security server, an identifier decrypted with the encrypted password;
      determining a public key corresponding to the private key utilized to encrypt the encrypted password based upon the identifier;
      decrypt the encrypted signature using the determined public key, the decrypted encrypted signature including a hash value of the public key of a secure shell server of the electronic device; and
      verify the authenticity of the electronic device when the hash value of the public key of a secure shell server of the electronic device matches a hash value of a encrypted signature previously displayed by the secure shell server of the electronic device.

4. An electronic device, comprising:
a processor;
a memory communicatively coupled to the processor, wherein the memory is configured to store a password for accessing the electronic device; and
a communication interface communicatively coupled to the processor,
wherein the processor is configured to:
receive, from a requesting device, a request to access the electronic device from the communication interface, the request received via a secure shell client;
encrypt the password stored in the memory with a public key to generate an encrypted version of the password for accessing the electronic device; and
transmit a banner via the secure shell client to the requesting device, the banner including the encrypted version of the password for accessing the electronic device embedded in the banner.

5. The electronic device of claim 4, wherein the memory is further configured to store the encrypted version of the password for accessing the electronic device.

6. The electronic device of claim 4, wherein the electronic device is a place-shifting device.

7. The electronic device of claim 4, wherein the communication interface is an internet network interface.

8. The electronic device of claim 4, wherein the processor is further configured to:
receive a second password from the communication interface; and
compare the second password to the password for accessing the electronic device stored in the memory.

9. A method for controlling access to an electronic device having a processor, a communication interface, and a memory configured to store a first password for granting access to the electronic device, the method comprising:
receiving, from the communication interface, a request to access the electronic device from an administrative device through a secure shell client;
encrypting, by the processor, the first password with a public key to create an encrypted version of the first password, wherein the encrypted version of the first password can only be decrypted by a corresponding private key, wherein the memory is further configured to store the encrypted version of the first password;
transmitting, by the communication interface, a banner to the administrative device through the secure shell client, the banner including the encrypted version of the first password embedded in the banner;
receiving, from the communication interface, a second password;
comparing, by the processor, the first password and the second password; and
granting, by the processor, access to the electronic device if the second password matches the first password.

10. The method of claim 9, wherein the electronic device is a place-shifting device.

11. The method of claim 10, wherein the communication interface is an internet network interface.

* * * * *